UNITED STATES PATENT OFFICE.

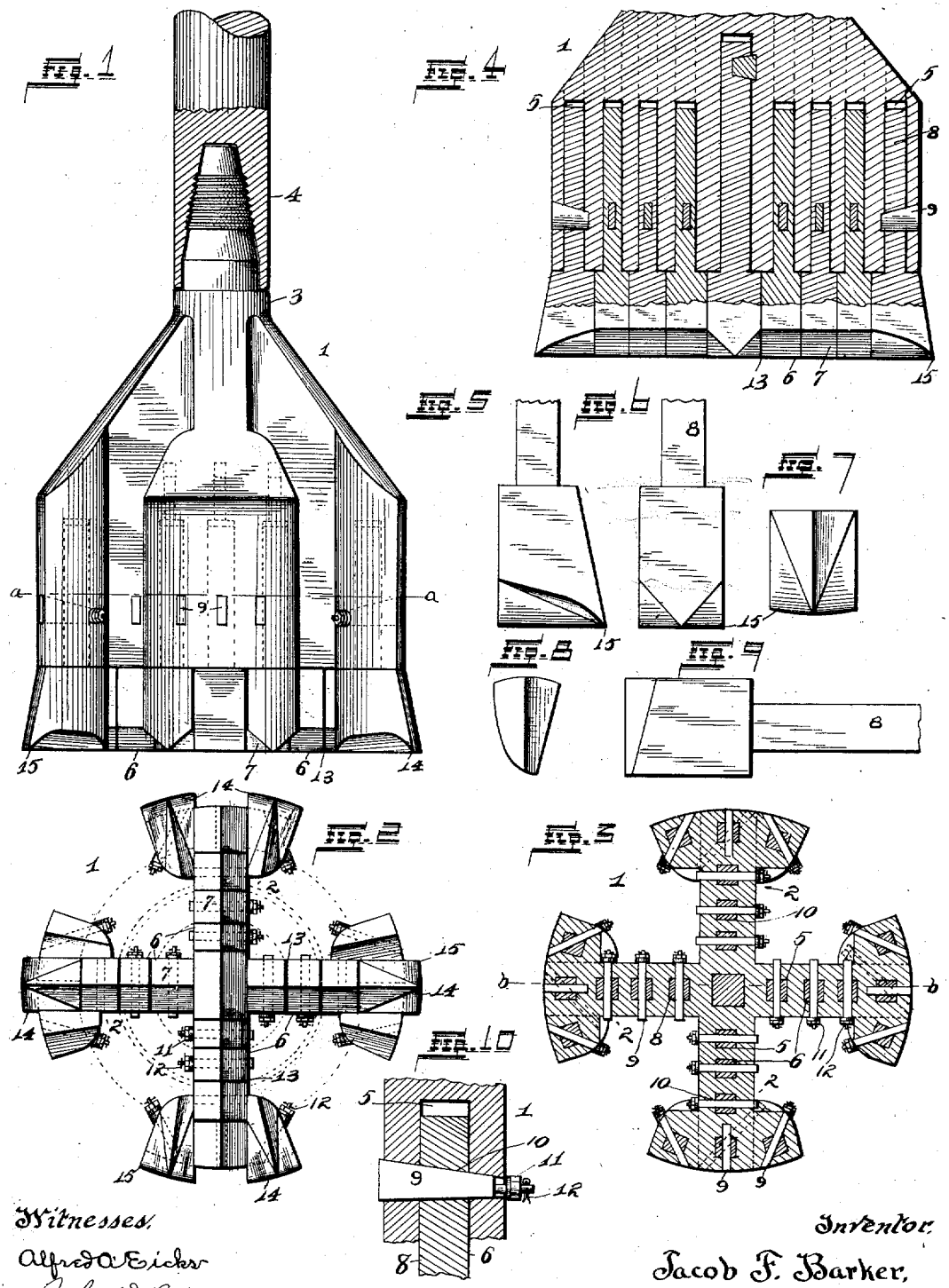

JACOB F. BARKER, OF CARTHAGE, MISSOURI.

DRILL-HEAD.

SPECIFICATION forming part of Letters Patent No. 652,554, dated June 26, 1900.

Application filed October 30, 1899. Serial No. 735,206. (No model.)

*To all whom it may concern:*

Be it known that I, JACOB F. BARKER, of the city of Carthage, Jasper county, State of Missouri, have invented certain new and useful Improvements in Drill-Heads, of which the following is a full, clear, and exact description, reference being had to the accompanying drawings, forming a part hereof.

This invention relates to drill-heads; and it consists of the novel construction, combination, and arrangement of parts hereinafter shown, described, and claimed.

The object of this invention is to provide an improved drill-head consisting of suitably-arranged radial arms, suitable drill teeth or bits, and a means of attaching said teeth or bits to said arms and of removing the same.

Figure 1 is a side view of my invention. Fig. 2 is an end view from below. Fig. 3 is a sectional view along the line $a\,a$ in Fig. 1. Fig. 4 is a vertical sectional view through a line $b\,b$ in Fig. 3. Fig. 5 is a side view of one of the edge teeth. Fig. 6 is another view of the same. Fig. 7 is an end view of the same. Fig. 8 is an end view of another of the edge teeth. Fig. 9 is a side view of the same. Fig. 10 is an enlarged sectional view showing the means of securing the teeth in the holder.

In the construction of this device I provide the holder 1, comprising a plurality of T-shaped radial arms 2, tapering at their upper end into a projection 3, which is for the purpose of attaching the holder 1 to a driving-rod 4. Extending into the arms 2 from their under surfaces are a plurality of sockets 5. Drill-teeth 6, having beveled edges 7, are provided with projections 8, which are for the purpose of extending into the sockets 5 in the arms 2. The drill-teeth 6 are retained in this position by wedge-shaped keys 9, one of which is provided for each of the drill-teeth 6. Said keys 9 pass through continuous apertures 10 through the arms 2 and the projections 8 and are securely fastened by the nuts 11 and the cotters 12. The meeting edges 13 of the drill-teeth 6 on opposite arms are in circular alinement with each other, but are out of circular alinement with the meeting edges 13 of the teeth on the intersecting arms, as shown by dotted lines in Fig. 2. This is for the purpose that the following tooth shall cut away all that may have passed between the teeth on the preceding radial arm. The outer ends of two opposite arms 2 are provided each with a head carrying a central curved peripheral cutting edge 15, which projects outwardly a distance beyond the contiguous end of its arm, while the remaining two opposite arms 2 are provided also with heads at their outer ends, and each head carries two curved peripheral cutting edges, located one on either side of the arm which carries it and both projecting a distance outwardly beyond the terminal of said arm.

The four arms 2 are straight and integral and are arranged at right angles, and each arm is provided with a series of straight intermediate cutting edges, as previously described, in alinement with the axis of the arm which carries them. It will thus be seen that each arm is provided at its outer end with a head or enlargement carrying an increased number of cutting edges, some of which are curved, and all of which, except the peripheral curved cutting edges, are alined toward the center of the drill-head.

A drill-head of this kind can be provided of any desired size and weight, is adapted for drilling through any kind of substance, and would be of great utility in mining regions. Shafts could be sunk by using this invention with great facility and at little cost. The drill-teeth can be removed with little trouble in case they become worn or otherwise useless and others substituted in their place. The drill-head is operated by rotating and reciprocating the driving-rod 4 by any means, said rod 4 being rigidly attached to the holder 1. The holder 1 is of such weight as to cause the drill-teeth 6 to cut through any substance which might be encountered.

If desired, the sockets 5 may be extended upwardly through the drill-head, as indicated by dotted lines in Figs. 1 and 4. This is for the purpose that in case the projections 8 should in any way bind in the sockets 5 a rod of any kind can be inserted therein and the drill-tooth be driven out with greater facility than it could otherwise be accomplished.

I claim—

The improved drill-head, comprising the holder or body 1 having four straight integral arms arranged at right angles and each provided with a series of straight intermediate cutting edges 7 in alinement with the axis of the arm which carries them, and each arm provided at its outer end with a head or enlargement carrying an increased number of cutting edges, some of which have curved peripheral edges and all of which except the curved peripheral edges are alined toward the center of the drill-head, the outer ends of two of said opposite arms 2 being provided with the curved peripheral cutting edges 15 which project outwardly a distance beyond the contiguous peripheral surface of its head, while the heads of the remaining two opposite arms 2 carry each two curved peripheral cutting edges located one on either side of the arm which carries it and both projecting a distance outwardly beyond the outer terminal of said arm, substantially as specified.

In testimony whereof I affix my signature in presence of two witnesses.

JACOB F. BARKER.

Witnesses:
  Mrs. F. B. SCHUTZ,
  EDWARD E. LONGAN.